June 16, 1942.　　C. L. THOMAS　　2,286,447
CATALYTIC CONVERSION OF HYDROCARBON OILS
Filed May 12, 1939
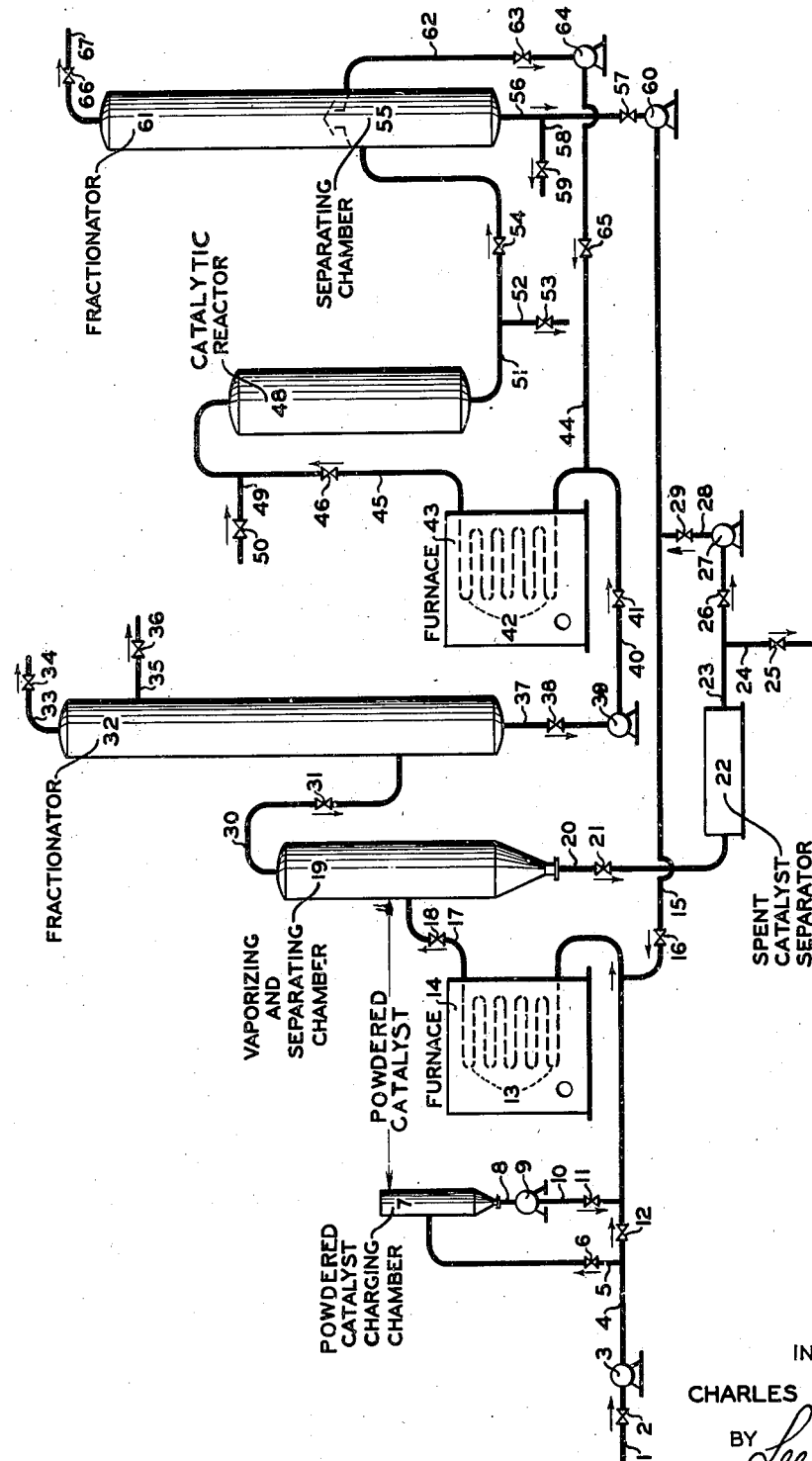
INVENTOR
CHARLES L. THOMAS
BY
ATTORNEY Patented June 16, 1942

2,286,447

UNITED STATES PATENT OFFICE 2,286,447

CATALYTIC CONVERSION OF HYDRO-
CARBON OILS

Charles L. Thomas, Chicago, Ill., assignor to Universal Oil Products Company, Chicago, Ill., a corporation of Delaware Application May 12, 1939, Serial No. 273,236

4 Claims. (Cl. 196—52).

This invention relates particularly to the treatment of hydrocarbon oils to produce large yields of high antiknock motor fuel.

It has been found in the cracking of hydrocarbon oils in the presence of catalysts that some oils such as those which decompose more or less on vaporization deposit carbonaceous material upon the catalyst so rapidly that only very short operating cycles are possible, the time required for regenerating the catalyst is unduly large and the catalyst is soon degenerated. More usually, these oils contain asphaltic components which even though not present in large quantities contaminate the catalyst so rapidly that it becomes uneconomical to process such oil catalytically to produce high antiknock motor fuel. It is among the objects of the present invention to provide a process for handling oils which readily deposit carbonaceous material by converting the oil in a primary step to produce a vaporized oil which in subsequent catalytic cracking does not deposit excessive amounts of carbonaceous material upon the catalyst.

The present invention provides an integrated processing sequence whereby the component parts or steps cooperate and coordinate one with the other so that the elements of the process function together in a new and novel manner. The process involves as a primary step the treatment of the high boiling hydrocarbon oil in the presence of a catalyst whereby coke-forming constituents are reacted and carbonaceous products continuously removed from the process while producing a high boiling fraction which is processed in the second step of the process in the presence of catalysts to produce large yields of high antiknock motor fuel.

In one specific embodiment, the present invention comprises admixing a powdered catalytic material with a hydrocarbon oil and heating the admixture in the turbulent condition while the oil undergoes a partial catalytic conversion treatment to separate out and remove carbonaceous material from the oil, directing the reaction mixture to a vaporizing and separating chamber, removing a nonvaporized oil admixed with spent catalytic material, condensing the vaporized oil in part and directing said condensed oil in admixture with insufficiently converted oil therefrom to contact with synthetically prepared silica-alumina catalyst to produce large yields of high antiknock motor fuel, separating a nonvaporized oil which is returned in part to said oil admixed with powdered catalyst undergoing conversion treatment, insufficiently converted hydrocarbons which are returned to contact with said silica-alumina catalyst as set forth, condensing and cooling the sufficiently converted vapors and gases removed overhead and separating the motor fuel from the normally gaseous hydrocarbons.

As a further embodiment the low molecular weight hydrocarbons produced concurrently with the high antiknock motor fuel are processed in the presence of a polymerizing catalyst to produce additional yields of high antiknock motor fuel.

In the primary step of the process the powdered catalytic material used to promote the desired preliminary conversion of the oil is a natural or artificial silica catalyst, or siliceous and aluminous material of more or less porous and refractory nature. The particular catalytic material selected will depend upon the coke depositing character of the oil charged and the extent of the preliminary conversion desired. Untreated or acid-treated clays, kieselguhr or fuller's earth with or without added difficultly reducible oxides are suitable, likewise, synthetically composited catalysts such as hydrated silica and hydrated alumina concurrently or separately precipitated and washed free from harmful adsorbed impurities, dried and calcined.

Although formed masses prepared from acid-treated clays, for example, may be used in the second step of the process, the preferred catalysts comprise specially prepared synthetic masses, for example, silica-alumina, silica-zirconia, silica-alumina-zirconia and silica-alumina-thoria having a relatively high degree of activity. These masses are prepared by admixing the precipitated components under conditions whereby alkali metal ions are excluded. Inasmuch as the chemistry of the true solid state is very incompletely developed, it has not been determined how these materials are arranged within the catalyst. In these catalysts the ratio of the components may vary within wide limits and the masses may be considered to comprise intimate or possibly molecular admixtures all of the components of which indicate more or less low activity individually but in the aggregate display high activity. In the secondary step these catalysts are used in the form of sized particles or other formed shapes such as pellets produced by compression or extrusion methods. The prepared composites after drying and forming into definite shapes are calcined at temperatures above approximately 1000° F. prior to contacting with the hydrocarbons.

In the second stage the vaporized hydrocarbons are preferably converted in the presence of the above described very high active catalytic materials and under conditions of operation whereby large yields of high antiknock motor fuel are produced concurrently with minor proportions of normally gaseous by-products containing relatively high percentages of olefins which may also be converted into high antiknock motor fuel as part of the process. The hydrocarbons are contacted with these catalysts under conditions where the catalyst activity is maintained substantially near the optimum point, the catalysts being regenerated before very substantial amounts of carbonaceous material is deposited. Although large yields of high antiknock motor fuel are preferably obtained when admixing recycle stock with the charge obtained from the primary step, good results may also be obtained when processing vaporized charging stock alone and insufficiently converted fractions therefrom in separate passes over the catalyst. A relatively large yield of normally gaseous olefins is concurrently produced and may be further treated to produce additional yields of high antiknock motor fuel as for example, in the presence of liquid or solid mineral acids or metal salt catalysts, or in the presence of the same types of catalysts used when producing the major yield of motor fuel. Thermal methods of polymerization without catalysts may also be used but not generally with equavalent results.

The process of the invention may be further illustrated by a reference to the attached diagrammatic drawing which shows a specific example of apparatus which may be used. The broad scope of the invention should not, however, be considered as limited to this particular example.

Referring to the drawing, charging stock to the process which may be preheated by means not shown is admitted through line 1 and valve 2 to pump 3 which pumps the oil through line 4 from which a part or all of the oil may be directed into line 5 regulated by valve 6 into the catalyst charging chamber 7. A suitable powdered catalyst for the process is continuously supplied to this chamber in the desired proportions and a slurry thereof is formed in the charging stock admitted to catalyst charging chamber 7. The slurry of oil and catalyst is directed through line 8 to pump 9 which pumps the catalyst in oil suspension through line 10 containing valve 11 into line 4 leading to heating element 13. Charging stock leaving the pump 3 and not directed to the catalyst charging chamber 7 flows through valve 12 and thence in admixture with the catalyst suspension to the heating element 13 located in a suitable furnace 14. A partially converted oil from a subsequent step in the process which will be hereinafter described may also be admitted to the oil undergoing treatment in heating element 13 through line 15 containing valve 16. The oil-catalyst suspension is maintained in a turbulent state and is heated under suitable conditions for partially "decoking" the oil undergoing treatment, the processed oil leaving the heating element 13 through line 17 regulated by valve 18 leading to the vaporizing and separating chamber 19. In an alternative mode of operation, the powdered catalyst may be charged into the oil after leaving the heating element, for example by admitting it directly to the chamber 19 as indicated on the drawing. A non-vaporized oil containing the spent catalyst is withdrawn from the bottom of the chamber 19 through line 20 containing valve 21 leading to the spent catalyst separator 22 which may consist of a filter, settling chamber or other equipment wherein the spent catalyst may be separated from the major part of the adhering oil, said oil flowing through line 23. It is then removed from the process through line 24 regulated by valve 25 or if the oil is not too heavy or highly aromatic it is directed through valve 26 to pump 27 which pumps the oil through line 28 containing valve 29 into line 15 leading back to the heating element 13. The spent filtered catalyst is then removed from the separating equipment 22 and is preferably burnt to free from carbonaceous deposits so as to regenerate the catalyst in a roasting furnace, for example, whereupon the cooled regenerated catalyst is returned to the process in admixture with fresh catalyst admitted to charging chamber 7. In an alternative operation, sufficiently intensive conditions may be utilized upon the oil undergoing conversion treatment in the heating element 13 such that the oil and catalyst separated in chamber 19 is rapidly withdrawn therefrom and directed to coking chambers where the admixture is coked. Vaporized oil leaving the chamber 19 flows through line 30 containing valve 31 to the fractionator 32 where a part or all of the vapors may be condensed and directed to subsequent treatment. With many charging stocks, however, such as crude oils and topped crudes, fractions may be removed overhead, for example motor fuel and normally gaseous constituents, which may be controlled in end point by means well known in the art and flowed through line 33 containing valve 34 leading to condensing, cooling and collecting means not shown. Also a fraction which may correspond in boiling point range to kerosene, for example, may be fractionated by well known means and removed at the side of the column as for example through line 35 containing valve 36 which is then directed to cooling and collecting means not shown. These fractions removed overhead may not only be contained in the charging stock initially but may also be produced in varying amounts in the primary conversion, the amounts thereof depending upon the charging stock and depth of cracking desired.

Catalytically produced distillate condensed and collected in the lower portion of fractionator 32 is removed through line 37 containing valve 38 leading to pump 39 which pumps this oil through line 40 containing valve 41 into heating element 42 disposed in a suitable furnace 43. This oil in admixture with insufficiently converted oil, separated as subsequently described and admitted to the oil flowing to the heating element 42 from line 44, is heated to suitable temperature for contacting with a granular catalyst, the heated oil flowing through line 45 containing valve 46 and leading to the catalyst containing chamber or reactor 48 for contacting substantially in the vapor phase. A plurality of these reactors may be used, some being in use while others are in process of regeneration or they may be used in pairs, one of a pair being in use while the other is being regenerated. The reactors may comprise a series of vertically disposed tubes in parallel between headers, the catalyst being disposed within said parallel tubes, or the beds of catalysts may be disposed in vessels wherein means are provided for regulating the temperature conditions during the alternate processing and regeneration operations. Heat may be supplied by indirect heat exchange to the oil vapors undergoing catalytic conversion to compensate for the endothermic heat of reaction and coiling fluids may be used in indirect heat exchange in the reactor to absorb heat generated in the reactivation operation. The regeneration of the catalyst may be illustrated by introducing an oxygen-containing gas through line 49 regulated by valve 50, valve 46 in line 45 being closed, and the gases after the regeneration are removed from the reactor as for example through line 51 and line 52, valve 53 in line 52 being open and valve 54 in line 51 being closed. Vapors admitted to the reactor through line 45 during the on stream period after contacting with the catalyst flow through line 51 containing valve 54 into the separating chamber 55, for the separation of a nonvaporized residue from the vaporized products. Cooling may be provided in line 54 by heat exchange or other well known means whereby the amount of nonvaporized oil separating out is regulated. Nonvaporized residue is withdrawn from the separating chamber 55 through line 56 and a portion or all of this oil may be removed through line 58 regulated by valve 59, and cooled by means not shown. Preferably, however, a major portion of this oil is directed through valve 57 to pump 60 which pumps this oil through line 15 and valve 16 into line 4 leading to the heating element 13 for admixture with fresh oil containing catalyst in suspension. Vapors leave the separating chamber 55 and flow to the fractionator 61 where insufficiently converted hydrocarbons are separated from sufficiently converted hydrocarbons removed overhead. The oil condensed in fractionator 61 is removed from the lower part thereof through line 62 containing valve 63 leading to pump 64 which pumps this oil into line 44 containing valve 65 and thence into line 40 leading to the heating element 42. Motor fuel product and gases are removed from the fractionator 61 through line 66 containing valve 67 leading to condensing, cooling and collecting means not shown, the end point of the motor fuel being regulated by return of regulated portions thereof to the top of the fractionator as generally understood in the art.

Operating conditions used in the process may vary over a relatively wide range depending upon various factors including the boiling point characteristics and type of hydrocarbons contained in the charging stock, the degree of cracking desired and various methods of operating the process which may be used within the scope of the invention. In the primary stage, the temperature used at the outlet of heating element may be within the approximate range of 750–925° F. and superatmospheric pressures within the approximate range of 100 to 1000 pounds per square inch may be used. Reduced pressures of approximately 40 to 50 pounds per square inch are preferably used in the vaporizing and separating chamber. Where the charging stock contains constituents which are readily adsorbed upon the catalyst surface and thereby prevent the desired conversion reactions, a portion or all of the powdered catalyst may be charged into the oil after being heated to the desired temperature. In the secondary stage of the process the average temperatures of the vaporized oil undergoing conversion in the reactor may be from 800–1150° F. The pressures employed are preferably low superatmospheric pressures ranging up to approximately 90 pounds per square inch. The temperature and pressure used on the oil vapors entering the separating chamber will be lower than those used at the exit of the reactor depending upon the degree of vaporization desired and the normal gradients through the subsequent fractionating, condensing and collecting equipment. In polymerizing the low molecular weight olefins especially propene and butenes, temperatures within the approximate range of 300–550° F. may be employed depending upon the specific gases processed and the catalyst used, superatmospheric pressures of approximately 150 to 1000 pounds per square inch being used.

As a specific example, a Mid-Continent reduced crude oil having an A. P. I. gravity of 19.2 was processed with 12% by weight of the charge of a finely divided, acid-washed clay and heated to a temperature of 860° F. at 200 pounds per square inch, and the admixture discharged into the vaporizing and separating chamber where a pressure of 50 pounds per square inch was used. The powdered catalyst was regenerated outside the system and reused, with only the heavy oil adhering to the catalyst being withdrawn from the first stage. Approximately 10% by volume of the charge of 400° F. end point motor fuel was produced having an octane number of 78 by the motor method. Vapors having boiling points above the motor fuel were directed to cracking in the presence of granular synthetically composited silica-alumina catalyst at an average temperature of 950° F. and approximately 38 pounds per square inch pressure. Motor fuel and gas were removed overhead and insufficiently cracked hydrocarbons returned to further contact with the granular catalyst in the approximate ratio of 4 parts recycled oil to one part of new stock admitted to the second stage. The combined yield of motor fuel from the first and second stages was 56% based on the oil charged and the octane number was 79. An additional 15% by volume of the raw oil charge of polymer gasoline of 82 octane number is obtained by the polymerization of the propene and butenes present in the gases from the process using a solid precalcined phosphoric acid catalyst obtained by disposing ortho- or pyro-phosphoric acid upon a siliceous adsorbent. Residuum of 14° A. P. I. gravity was also obtained from the process to the extent of 14% by volume of the oil charged to the process.

I claim as my invention:
1. A process for converting high-boiling hydrocarbon oil, containing constituents which readily deposit heavy carbonaceous material, into large yields of high antiknock motor fuel, which comprises, mixing a powdered contact material with the oil and passing the resultant mixture, in turbulent flow and as a restricted stream, through a heating coil, subjecting the mixture in said coil to relatively mild conversion under sufficient pressure to maintain a substantial portion of the oil in liquid phase to separate carbonaceous matter from the oil and collect the same on said contact material, separating the coil effluent into vapors containing hydrocarbons heavier than gasoline and a residue containing said contact material and carbonaceous matter, passing said hydrocarbons heavier than gasoline, in vapor phase, through a stationary bed of cracking catalyst and subjecting the same to more drastic cracking than the oil in said coil, fractionating the resultant products to separate relatively heavy and light recycle stocks from gasoline boiling hydrocarbons, returning the heavier recycle stock to said coil and the lighter recycle stock to the vapor phase catalytic cracking operation, and recovering said gasoline boiling hydrocarbons.

2. A process for converting high-boiling hydrocarbon oil, containing constituents which readily deposite heavy carbonaceous material, into large yields of high antiknock motor fuel, which comprises, mixing a powdered contact material with the oil and passing the resultant mixture, in turbulent flow and as a restricted stream, through a heating coil, subjecting the mixture in said coil to relatively mild conversion under sufficient pressure to maintain a substantial portion of the oil in liquid phase to separate carbonaceous matter from the oil and collect the same on said contact material, separating the coil effluent into vapors and residue, fractionating the vapors to condense and separate hydrocarbons heavier than gasoline from gasoline boiling hydrocarbons, revaporizing heavier hydrocarbons and subjecting the vapors thereof to more drastic cracking than the oil in said coil while passing through a stationary bed of cracking catalyst, fractionating the resultant products to separate relatively heavy and light recycle stocks from gasoline boiling hydrocarbons, returning the heavier recycle stock to said coil and the lighter recycle stock to the vapor phase catalytic cracking operation, and recovering said gasoline boiling hydrocarbons.

3. A process for converting high-boiling hydrocarbon oil, containing constituents which readily deposite heavy carbonaceous material, into large yields of high antiknock motor fuel, which comprises, mixing a powdered contact material with the oil and passing the resultant mixture, in turbulent flow and as a restricted stream, through a heating coil, subjecting the mixture in said coil to relatively mild conversion under sufficient pressure to maintain a substantial portion of the oil in liquid phase to separate carbonaceous matter from the oil and collect the same on said contact material, separating the coil effluent into vapors containing hydrocarbons heavier than gasoline and a residue containing said contact material and carbonaceous matter, passing said hydrocarbons heavier than gasoline, in vapor phase, through a stationary bed of cracking catalyst and subjecting the same to more drastic cracking than the oil in said coil, fractionating the resultant products to separate gasoline boiling hydrocarbons from heavier fractions, returning at least a portion of said heavier fractions to said coil, and recovering said gasoline boiling hydrocarbons.

4. A process for converting high-boiling hydrocarbon oil, containing constituents which readily deposite heavy carbonaceous material, into large yields of high antiknock motor fuel, which comprises, mixing a powdered contact material with the oil and passing the resultant mixture, in turbulent flow and as a restricted stream, through a heating coil, subjecting the mixture in said coil to relatively mild conversion under sufficient pressure to maintain a substantial portion of the oil in liquid phase to separate carbonaceous matter from the oil and collect the same on said contact material, separating the coil effluent into vapors containing hydrocarbons heavier than gasoline and a residue containing said contact material and carbonaceous matter, passing said hydrocarbons heavier than gasoline, in vapor phase, through a stationary bed of cracking catalyst and subjecting the same to more drastic cracking than the oil in said coil, fractionating the resultant products to separate gasoline boiling hydrocarbons from heavier fractions, returning at least a portion of said heavier fractions to the vapor phase catalytic cracking operation, and recovering said gasoline boiling hydrocarbons.

CHARLES L. THOMAS.